US010139474B2

(12) United States Patent
Gurusamy et al.

(10) Patent No.: US 10,139,474 B2
(45) Date of Patent: Nov. 27, 2018

(54) METHODS AND SYSTEMS FOR PROVIDING LIVE WEATHER DATA ONBOARD AN AIRCRAFT (71) Applicant: HONEYWELL INTERNATIONAL INC., Morris Plains, NJ (US)

(72) Inventors: Saravanakumar Gurusamy, Tamil Nadu (IN); Madhava Gadicherla, Karnataka (IN); Jayasenthilnathan B, Karnataka (IN); Roger W Burgin, Scottsdale, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 15/439,158

(22) Filed: Feb. 22, 2017

(65) Prior Publication Data
US 2018/0238996 A1  Aug. 23, 2018

(51) Int. Cl.
G01S 7/24 (2006.01)
G09G 5/02 (2006.01)
(Continued)

(52) U.S. Cl.
CPC .......... G01S 7/24 (2013.01); G01S 7/003 (2013.01); G01S 7/52036 (2013.01);
(Continued)

(58) Field of Classification Search
CPC ........ G01S 7/24; G01S 7/003; G01S 7/52036; G01S 7/52071; G01S 13/953;
(Continued)

(56) References Cited

U.S. PATENT DOCUMENTS 6,043,756 A * 3/2000 Bateman et al. ....... G01S 7/003 342/26 R
6,441,773 B1 * 8/2002 Kelly et al. ............ G01S 7/003 342/26
(Continued)

FOREIGN PATENT DOCUMENTS

EP  2148221 A1  1/2010

OTHER PUBLICATIONS

Extended EP Search Report for Application No. 18157232.2 dated Jun. 7, 2018.

Primary Examiner — Dale W Hilgendorf
(74) Attorney, Agent, or Firm — Lorenz & Kopf, LLP (57) ABSTRACT A method for presenting weather information onboard an aircraft is provided. The method obtains a first set of weather data from aircraft onboard radar system; obtains a second set of weather data from external sources including one or more external aircraft, a satellite, a remote server, and a ground-based weather station, wherein the communication device is compatible a communication protocol for the external sources, and wherein the communication protocol comprises at least one of a datalink communication protocol, a satellite communication protocol, a very high frequency (VHF) radio communication protocol, and a transponder communication protocol; and presents graphical elements comprising a first set of graphical elements associated with the first set of weather data and a second set of graphical elements associated with the second set of weather data, wherein the second set of graphical elements include visual characteristics distinguishable from the first set of graphical elements.

17 Claims, 9 Drawing Sheets (51) Int. Cl.
    *G01S 13/95*     (2006.01)
    *G01S 7/00*      (2006.01)
    *G08G 5/00*      (2006.01)
    *G01S 7/52*      (2006.01)
    *G06F 3/0484*    (2013.01)

(52) U.S. Cl.
    CPC ............ *G01S 13/953* (2013.01); *G08G 5/003* (2013.01); *G08G 5/0008* (2013.01); *G08G 5/0013* (2013.01); *G08G 5/0091* (2013.01); *G09G 5/02* (2013.01); *G01S 7/52071* (2013.01); *G06F 3/0484* (2013.01); *G09G 2320/0666* (2013.01); *G09G 2380/12* (2013.01)

(58) Field of Classification Search
    CPC .... G08G 5/0091; G08G 5/003; G08G 5/0008; G08G 5/0013; G09G 5/02; G09G 2380/12; G09G 2320/0666; G06F 3/0484
    See application file for complete search history.

(56) References Cited

U.S. PATENT DOCUMENTS

| | | | | |
|---|---|---|---|---|
| 6,448,922 B1 * | 9/2002 | Kelly | ...................... | G01S 7/003 342/26 R |
| 6,828,922 B1 * | 12/2004 | Gremmert et al. | ..... | G01S 7/003 701/14 |
| 7,027,898 B1 | 4/2006 | Leger et al. | | |
| 7,515,088 B1 * | 4/2009 | Woodell et al. | ......... | G01S 7/003 342/26 B |
| 7,633,428 B1 | 12/2009 | McCusker et al. | | |
| 7,817,078 B2 * | 10/2010 | Bunch | ...................... | G01S 7/003 342/26 B |
| 8,344,933 B1 * | 1/2013 | Kronfeld et al. | ...... | G01S 13/953 342/25 R |
| 8,600,587 B1 * | 12/2013 | Seah et al. | ........... | G08G 5/0091 701/14 |
| 8,604,963 B1 * | 12/2013 | Kronfeld et al. | ...... | G01S 13/953 342/26 B |
| 9,223,020 B1 * | 12/2015 | Crosmer et al. | ...... | G01S 13/953 |
| 9,244,167 B1 * | 1/2016 | Oransky et al. | ......... | G01S 7/003 |
| 9,473,367 B2 * | 10/2016 | Tieftrunk et al. | .... | G08G 5/0013 |
| 9,535,158 B1 * | 1/2017 | Breiholz et al. | ....... | G01S 13/953 |
| 9,810,770 B1 * | 11/2017 | Weichbrod et al. | .... | G01S 7/003 |
| 9,869,766 B1 * | 1/2018 | Breiholz et al. | ....... | G01S 13/953 |
| 2009/0219197 A1 | 9/2009 | Bunch | | |
| 2009/0322594 A1 * | 12/2009 | Khatwa | .................. | G01S 13/953 342/26 B |
| 2010/0019938 A1 * | 1/2010 | Bunch | ................... | G01S 13/953 340/963 |
| 2010/0315281 A1 | 12/2010 | Askelson et al. | | |
| 2010/0332056 A1 * | 12/2010 | Kirk | ........................ | G01S 7/003 701/14 |
| 2013/0249712 A1 * | 9/2013 | Buratto et al. | ......... | G01S 13/953 340/971 |
| 2014/0039734 A1 * | 2/2014 | Ramaiah et al. | .... | G08G 5/0013 701/14 |
| 2016/0266249 A1 * | 9/2016 | Kauffman et al. | .... | G01S 13/953 |
| 2017/0082745 A1 * | 3/2017 | Kronfeld et al. | ......... | G01S 7/24 |

* cited by examiner

METHODS AND SYSTEMS FOR PROVIDING LIVE WEATHER DATA ONBOARD AN AIRCRAFT

TECHNICAL FIELD

Embodiments of the subject matter described herein relate generally to providing weather data onboard an aircraft. More particularly, embodiments of the subject matter relate to obtaining relevant weather data from various sources and presenting intuitive graphical elements associated with the acquired weather data.

BACKGROUND

Weather data is critical information used to plan and execute a flight plan by a flight crew onboard an aircraft. Extreme weather conditions have the potential to inflict damage on an aircraft, or cause an aircraft to go off-course. Due to the risks involved in flying in bad weather, flight crews generally obtain current weather data associated with a flight plan in order to avoid bad weather. Obtained weather data assists the flight crew in pre-flight course planning and maintaining or diverting from the flight plan during flight.

Accordingly, it is desirable to have weather data that is as complete and comprehensive as possible, so that the flight crew has as much information as possible to make decisions associated with pre-flight planning and with course adjustments during flight. Furthermore, other desirable features and characteristics will become apparent from the subsequent detailed description and the appended claims, taken in conjunction with the accompanying drawings and the foregoing technical field and background.

BRIEF SUMMARY

Some embodiments of the present disclosure provide a method for presenting weather information onboard an aircraft. The method obtains, by at least one processor, a first set of weather data from aircraft onboard radar system; obtains, by the at least one processor via a communication device, a second set of weather data from external sources including at least one of one or more external aircraft, a satellite, a remote server, and a ground-based weather station, wherein the communication device is compatible a communication protocol for the external sources, and wherein the communication protocol comprises at least one of a datalink communication protocol, a satellite communication protocol, a very high frequency (VHF) radio communication protocol, and a transponder communication protocol; and presents graphical elements comprising a first set of graphical elements associated with the first set of weather data and a second set of graphical elements associated with the second set of weather data, via a display device communicatively coupled to the at least one processor, wherein the second set of graphical elements include visual characteristics distinguishable from the first set of graphical elements.

Some embodiments of the present disclosure provide a system for presenting weather information onboard an aircraft. The system includes a system memory element; an aircraft onboard radar system, configured to obtain radar weather data for the aircraft; a communication device, configured to obtain externally sourced weather data from external sources including at least one of one or more external aircraft, a satellite, a remote server, and a ground-based weather station, wherein the communication device is compatible a communication protocol for the external sources, and wherein the communication protocol comprises at least one of a datalink communication protocol, a satellite communication protocol, a very high frequency (VHF) radio communication protocol, and a transponder communication protocol; a display device, configured to present weather data onboard the aircraft; and at least one processor, communicatively coupled to the system memory element, the communication device, and the display device, the at least one processor configured to: obtain a first set of weather data via aircraft onboard radar system, wherein the radar weather data comprises the first set of data; obtain a second set of weather data via the communication device, wherein the externally sourced weather data comprises the second set of data; and present graphical elements via the display device, wherein the graphical elements comprise a first set of graphical elements associated with the first set of weather data and a second set of graphical elements associated with the second set of weather data, wherein the second set of graphical elements include visual characteristics distinguishable from the first set of graphical elements.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The subject matter presented herein relates to systems and methods for providing connected weather data onboard an aircraft during flight. More specifically, the subject matter relates to obtaining weather data, associated with as primary or secondary flight plant, from multiple sources and presenting the obtained weather data using intuitive graphical elements which indicate how recently the weather data was obtained, real-time refreshing of weather data during flight, presenting indications of unavailability of weather data for particular areas, and the like.

Certain terminologies are used with regard to the various embodiments of the present disclosure. Connected weather data refers to weather data associated with a particular flight plan that has been obtained from various sources, including but not limited to: radar weather data, transponder communications with other aircraft and/or ground control, wireless communications (e.g., datalink, satellite, VHF radio, cellular, wi-fi) with one or more remote servers.

Figure 1:
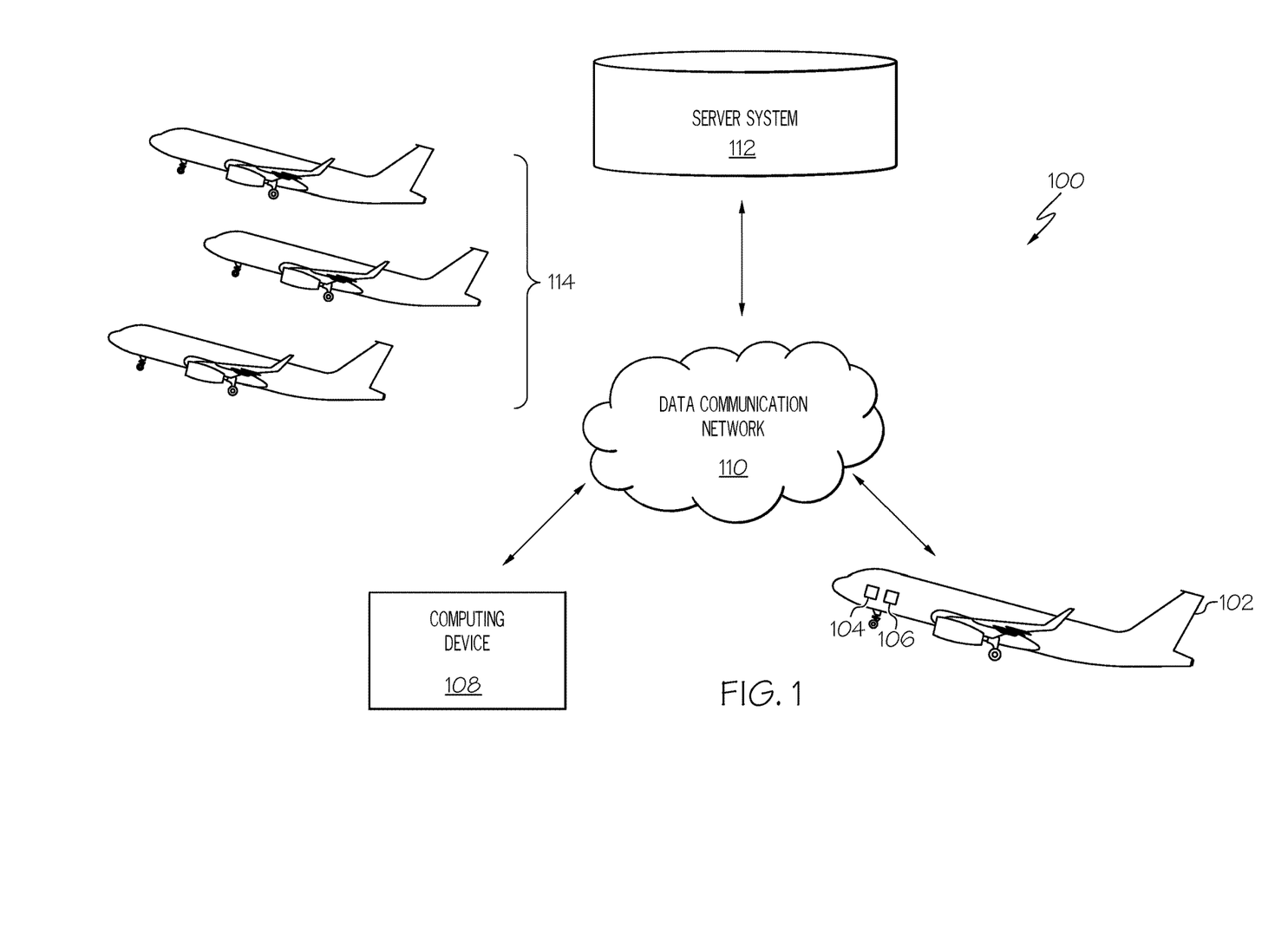
FIG. 1 is a diagram of a connected weather presentation system, in accordance with the disclosed embodiments.

Turning now to the figures, FIG. 1 is a diagram of a connected weather presentation system 100, in accordance with the disclosed embodiments. The connected weather presentation system 100 operates to acquire and present a comprehensive set of weather data onboard an aircraft 102 during flight. The connected weather presentation system 100 may include, without limitation, a computing device 108 that communicates with one or more avionics systems 104, aircraft onboard radar 106, and at least one server system 112, via a data communication network 110. In practice, certain embodiments of the connected weather presentation system 100 may include additional or alternative elements and components, as desired for the particular application.

The computing device 108 may be implemented by any computing device that includes at least one processor, some form of memory hardware, a user interface, and communication hardware. For example, the computing device 108 may be implemented using a personal computing device, such as a tablet computer, a laptop computer, a personal digital assistant (PDA), a smartphone, or the like. In this scenario, the computing device 108 is capable of storing, maintaining, and executing an Electronic Flight Bag (EFB) application configured to determine and present connected weather data. In other embodiments, the computing device 108 may be implemented using a computer system onboard the aircraft 102, which is configured to determine and present connected weather data.

The aircraft 102 may be any aviation vehicle for which connected weather data is relevant and applicable during completion of a flight route. The aircraft 102 may be implemented as an airplane, helicopter, spacecraft, hovercraft, or the like. The one or more avionics systems 104 may include a Flight Management System (FMS), Automatic Dependent Surveillance—Broadcast (ADS-B) devices, or the like. Data obtained from the one or more avionics systems 104 may include, without limitation: flight plan data (e.g., waypoint data), weather data, or the like. The aircraft onboard radar 106 may be implemented by any radar-based weather data acquisition system configured for use onboard the aircraft 102 during flight. Exemplary embodiments of the aircraft onboard radar 106 may include RDR4K and/or other conventional forms of aircraft onboard radar.

The server system 112 may include any number of application servers, and each server may be implemented using any suitable computer. In some embodiments, the server system 112 includes one or more dedicated computers. In some embodiments, the server system 112 includes one or more computers carrying out other functionality in addition to server operations. The server system 112 may store and provide any type of weather data and/or flight plan data.

The computing device 108 is usually located onboard the aircraft 102, and the computing device 108 communicates with the one or more avionics systems 104, the aircraft onboard radar 106, the server system 112, and other aircraft 114 that have traveled the geographic area defined by the flight plan, via wired and/or wireless communication connection. The computing device 108 and the server system 112 are generally disparately located, and the computing device 108 communicates with the server system 112 via the data communication network 110 and/or via communication mechanisms onboard the aircraft 102.

The data communication network 110 may be any digital or other communications network capable of transmitting messages or data between devices, systems, or components. In certain embodiments, the data communication network 110 includes a packet switched network that facilitates packet-based data communication, addressing, and data routing. The packet switched network could be, for example, a wide area network, the Internet, or the like. In various embodiments, the data communication network 110 includes any number of public or private data connections, links or network connections supporting any number of communications protocols. The data communication network 110 may include the Internet, for example, or any other network based upon TCP/IP or other conventional protocols. In various embodiments, the data communication network 110 could also incorporate a wireless and/or wired telephone network, such as a cellular communications network for communicating with mobile phones, personal digital assistants, and/or the like. The data communication network 110 may also incorporate any sort of wireless or wired local and/or personal area networks, such as one or more IEEE 802.3, IEEE 802.16, and/or IEEE 802.11 networks, and/or networks that implement a short range protocol. For the sake of brevity, conventional techniques related to data transmission, signaling, network control, and other functional aspects of the systems (and the individual operating components of the systems) may not be described in detail herein.

During typical operation, the computing device 108 obtains relevant weather data from the one or more avionics systems 104, aircraft onboard radar 106, the remote server system 112, and other aircraft 114. The other aircraft 114 may be currently located in the geographic area defined by the flight plan, or may have traveled in the geographic area defined by the flight plan in the recent past and have stored or otherwise retained applicable weather data. The computing device 108 then presents the connected weather data associated with a current flight plan using graphical elements presented via a display device onboard the aircraft 102. In an exemplary embodiment, the onboard weather unit (e.g. RDR4K) scans the outside environment and provides the volumetric data. For regions where weather data is not available, connected weather data is requested and obtained via a datalink, SATCOM communication connection, very high frequency (VHF) radio communication, or the like. The computing device 108 fuses the weather data from these sources and displays onboard radar weather data as a solid patch and connected weather data differently (e.g. using hashed lines). In addition, connected weather data with varying timestamps are shaded differently (e.g., using varying levels of transparency) to identify the age of the weather data. Regions for which connected weather data and radar weather data is not available, requested, or obtained, are shaded differently such that the flight crew is notified of potential weather data for such regions. In some embodiments, the computing device 108 presents the connected weather data and the radar weather data using a synthetic vision system (SVS), a combined vision system (CVS), a navigation display or map display, a vertical situation display (VSD), and near-to-eye (NTE) display devices.

Figure 2:
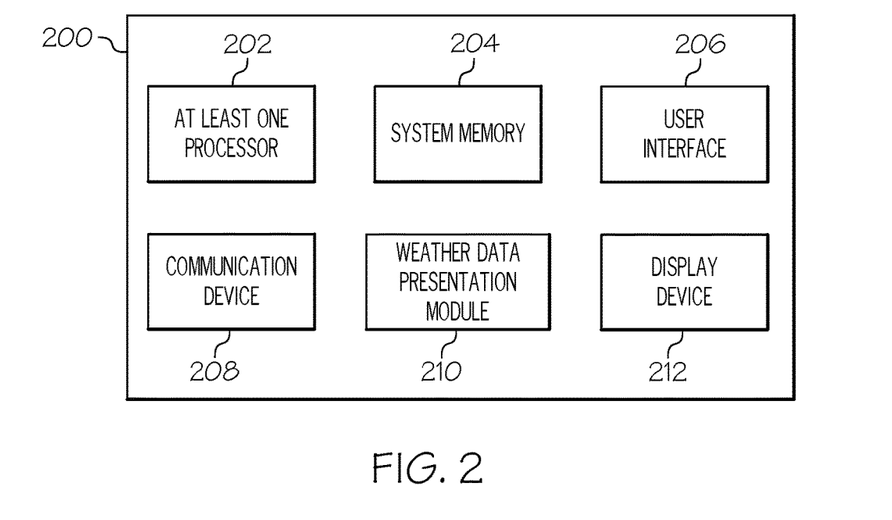
FIG. 2 is a functional block diagram of a computing device, in accordance with the disclosed embodiments.

FIG. 2 is a functional block diagram of a computing device 200, in accordance with the disclosed embodiments. It should be noted that the computing device 200 can be implemented with the computing device 108 depicted in FIG. 1. In this regard, the computing device 200 shows certain elements and components of the computing device 108 in more detail. The computing device 200 generally includes, without limitation: at least one processor 202; system memory 204; a user interface 206; a communication device 208; a weather data presentation module 210; and a display device 212. These elements and features of the computing device 200 may be operatively associated with one another, coupled to one another, or otherwise configured to cooperate with one another as needed to support the desired functionality—in particular, dynamically providing connected weather data onboard an aircraft during flight, as described herein. For ease of illustration and clarity, the various physical, electrical, and logical couplings and interconnections for these elements and features are not depicted in FIG. 2. Moreover, it should be appreciated that embodiments of the computing device 200 will include other elements, modules, and features that cooperate to support the desired functionality. For simplicity, FIG. 2 only depicts certain elements that relate to the fuel tankering recommendation-generating techniques described in more detail below.

The at least one processor 202 may be implemented or performed with one or more general purpose processors, a content addressable memory, a digital signal processor, an application specific integrated circuit, a field programmable gate array, any suitable programmable logic device, discrete gate or transistor logic, discrete hardware components, or any combination designed to perform the functions described here. In particular, the at least one processor 202 may be realized as one or more microprocessors, controllers, microcontrollers, or state machines. Moreover, the at least one processor 202 may be implemented as a combination of computing devices, e.g., a combination of digital signal processors and microprocessors, a plurality of microprocessors, one or more microprocessors in conjunction with a digital signal processor core, or any other such configuration.

The at least one processor 202 is communicatively coupled to the system memory 204. The system memory 204 is configured to store any obtained or generated connected weather data associated with one or more flight plans or flight profiles, and graphical elements associated with the weather data, the age of the weather data, and limitations of the weather data. The system memory 204 may be realized using any number of devices, components, or modules, as appropriate to the embodiment. Moreover, the computing device 200 could include system memory 204 integrated therein and/or a system memory 204 operatively coupled thereto, as appropriate to the particular embodiment. In practice, the system memory 204 could be realized as RAM memory, flash memory, EPROM memory, EEPROM memory, registers, a hard disk, a removable disk, or any other form of storage medium known in the art. In certain embodiments, the system memory 204 includes a hard disk, which may also be used to support functions of the computing device 200. The system memory 204 can be coupled to the at least one processor 202 such that the at least one processor 202 can read information from, and write information to, the system memory 204. In the alternative, the system memory 204 may be integral to the at least one processor 202. As an example, the at least one processor 202 and the system memory 204 may reside in a suitably designed application-specific integrated circuit (ASIC).

The user interface 206 may include or cooperate with various features to allow a user to interact with the computing device 200. Accordingly, the user interface 206 may include various human-to-machine interfaces, e.g., a keypad, keys, a keyboard, buttons, switches, knobs, a touchpad, a joystick, a pointing device, a virtual writing tablet, a touch screen, a microphone, or any device, component, or function that enables the user to select options, input information, or otherwise control the operation of the computing device 200. For example, the user interface 206 could be manipulated by an operator to receive user input selections of connected weather data for a particular flight plan or subset of a flight plan, as described herein.

In certain embodiments, the user interface 206 may include or cooperate with various features to allow a user to interact with the computing device 200 via graphical elements rendered on a display element (e.g., the display device 212). Accordingly, the user interface 206 may initiate the creation, maintenance, and presentation of a graphical user interface (GUI). In certain embodiments, the display device 212 implements touch-sensitive technology for purposes of interacting with the GUI. Thus, a user can manipulate the GUI by moving a cursor symbol rendered on the display device 212, or by physically interacting with the display device 212 itself for recognition and interpretation, via the user interface 206.

The communication device 208 is suitably configured to communicate data between the computing device 200 and other aircraft, one or more remote servers, one or more avionics systems onboard an aircraft, and an aircraft onboard radar system. The communication device 208 may transmit and receive communications over a wireless local area network (WLAN), the Internet, a satellite uplink/downlink, a cellular network, a broadband network, a wide area network, or the like. As described in more detail below, data received by the communication device 208 may include, without limitation, weather data, and other data compatible with the computing device 200. Data provided by the communication device 208 may include, without limitation, requests for connected weather data, obtained local weather data, and the like.

The weather data presentation module 210 is configured to obtain weather data via the communication device 208, as described above, and to present graphical elements representing the weather data via the display device 212. The weather data presentation module 210 is further configured to include graphical elements indicating an age of the weather data obtained, whether the weather data is obtained from onboard radar or external sources, geographic areas for which weather data is unavailable, and areas for which off-screen weather data has been obtained. In practice, the weather data presentation module 210 may be implemented with (or cooperate with) the at least one processor 202 to perform at least some of the functions and operations described in more detail herein. In this regard, the weather data presentation module 210 may be realized as suitably written processing logic, application program code, or the like.

The display device 212 is configured to display various icons, text, and/or graphical elements associated with connected weather data, including flight plan details, weather data limitations, indications of weather data age, or the like. The display device 212 may be implemented using, without limitation, a vertical situation display (VSD), a near-to-eye (NTE) display, a head-up display (HUD), a synthetic vision system (SVS), or any other type of display device integrated into, or communicatively coupled to, the computing device 200.

In an exemplary embodiment, the display device 212 and the user interface 206 are communicatively coupled to the at least one processor 202. The at least one processor 202, the user interface 206, and the display device 212 are cooperatively configured to display, render, or otherwise convey one or more graphical representations or images associated with connected weather data on the display device 212, as described below in greater detail. In an exemplary embodiment, the display device 212 is realized as an electronic display configured to graphically display connected weather data, as described herein. In some embodiments, the computing device 200 is an integrated computer system onboard an aircraft, and the display device 212 is located within a cockpit of the aircraft, and is thus implemented as an aircraft display. In other embodiments, the display device 212 is implemented as a display screen of a standalone, personal computing device (e.g., laptop computer, tablet computer). It will be appreciated that although the display device 212 may be implemented using a single display, certain embodiments may use additional displays (i.e., a plurality of displays) to accomplish the functionality of the display device 212 described herein.

Figure 3:
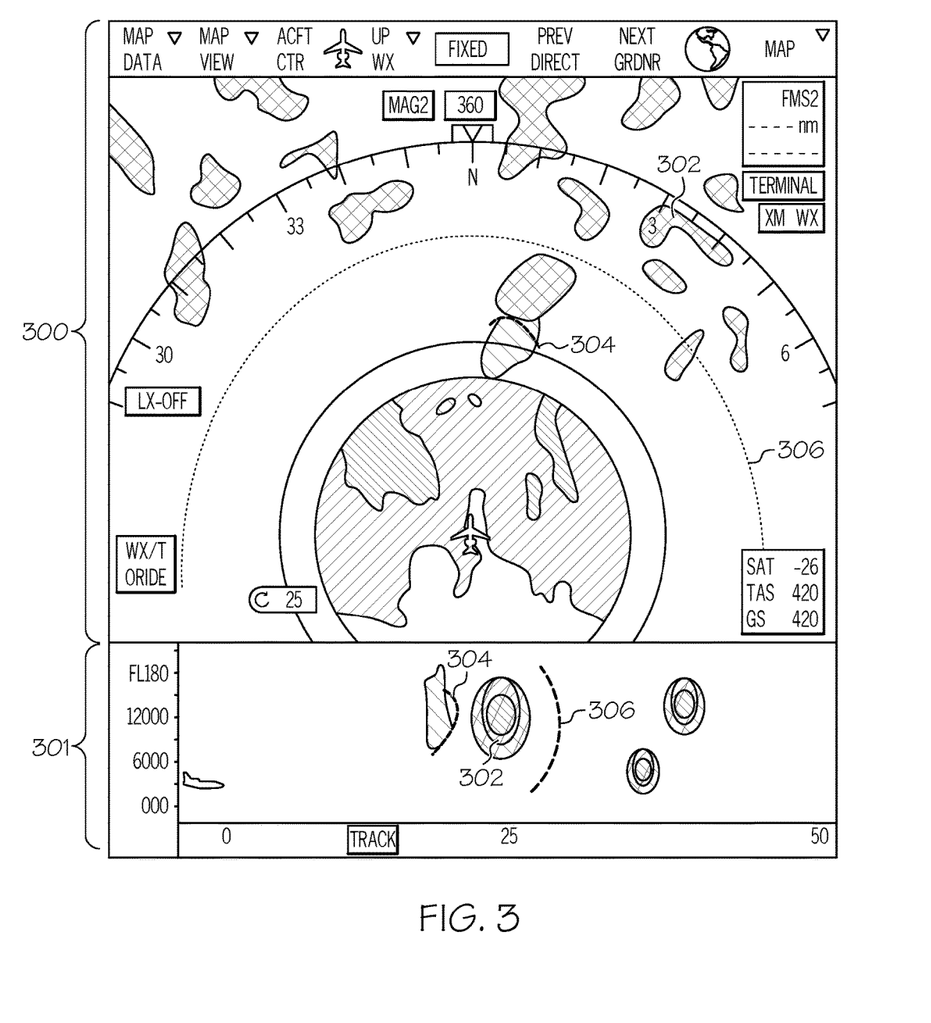
FIG. 3 is a diagram of a presentation of connected weather data, in accordance with the disclosed embodiments.

FIG. 3 is a diagram of a map display 300 and a vertical display 301 of connected weather data, presented by a display device onboard an aircraft, in accordance with the disclosed embodiments. As shown, the map display 300 presents connected weather data (i.e., weather data obtained from external sources) in a format distinct from the onboard radar weather data representation on the cockpit displays (e.g., the map display 300 and the vertical display 301). The onboard weather radar scan is shown in solid patches, whereas the connected weather data is shown using hashed lines 302.

A dashed arc 304 for range of onboard radar is used to represent the boundary of the onboard weather radar, or in other words, the dashed arc 304 indicates the operating range of the onboard weather radar. Based on the flight profile, the connected weather presentation system (described previously with regard to FIGS. 1-2) automatically requests data, from external sources, for the areas extending beyond the range of onboard weather radar. In some embodiments, once the flight plan is available, a swath is determined on either side of the flight path (e.g., a 15 mile swath extending to either side of the flight path defined by waypoints) and connected weather data is requested automatically for the same. In addition, if the onboard radar senses a rain attenuation area (e.g., a Rain Echo Attenuation Compensation Technique (REACT) zone), connected weather data is automatically requested for that zone and represented using hashed lines. In addition, a dashed arc 306 is displayed for weather occluded connected radar.

Figure 4:
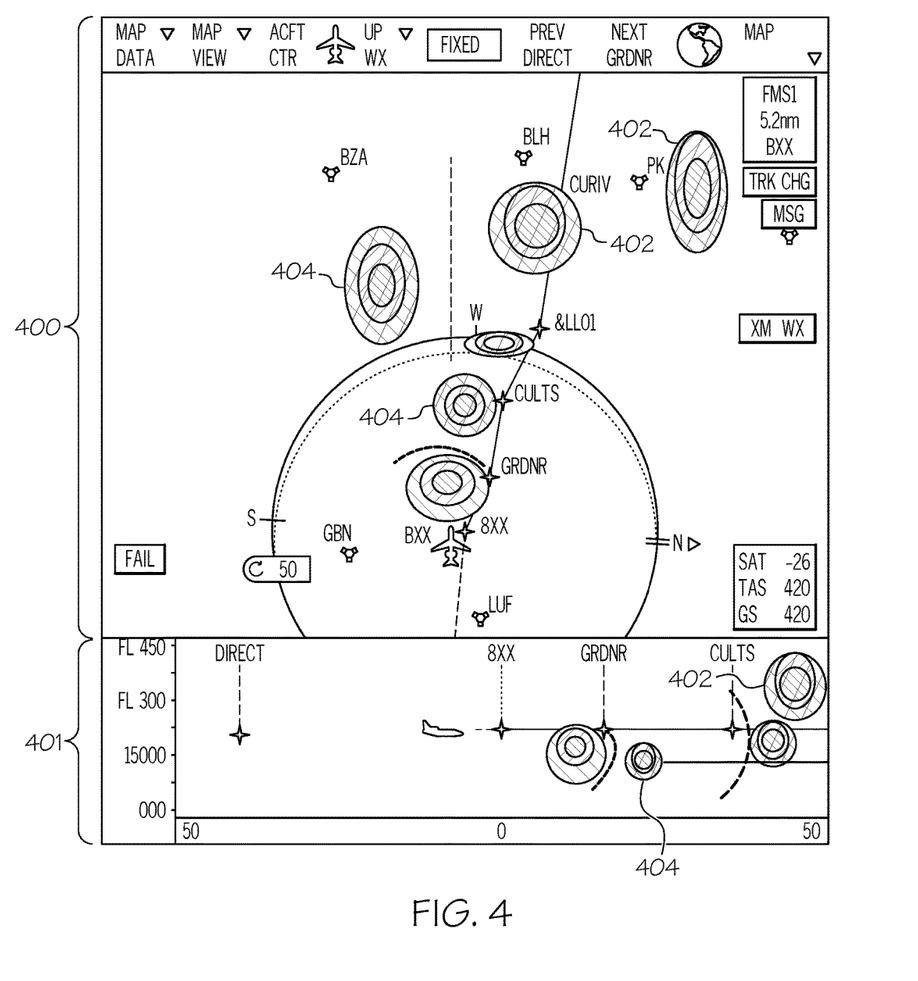
FIG. 4 is a diagram of a second presentation of connected weather data, in accordance with the disclosed embodiments.

FIG. 4 is a diagram of a map display 400 and a vertical display 401 of connected weather data, in accordance with the disclosed embodiments. As shown, the map display 400 presents connected weather data (i.e., weather data obtained from external sources) in a format distinct from the onboard radar weather data representation on the cockpit displays (e.g., the map display 400 and the vertical display 401). The onboard weather radar scan is shown in solid patches, whereas the connected weather data is shown using hashed lines.

The presented weather data may be recently-obtained weather data or older weather data obtained past a particular acquisition time period. An additional distinction is presented by the map display 400 and the vertical display 401 to illustrate varying "degrees of freshness" of the connected weather data. Here, the connected weather presentation system varies the transparency of the connected weather hashed line display as a factor of the freshness of the data, as shown. A higher transparency factor is used for the older data whereas little or no transparency is used for the newer or more recently acquired weather data. Such a representation provides further confidence to the flight crew as to the reliability and recent acquisition of the data presented on the weather display. For example, the first set of graphical elements 402 representing connected weather data are presented using a high degree of transparency, indicating that the first set of graphical elements 402 includes older data. The second set of graphical elements 404 representing connected weather data are presented using a low degree of transparency and an increased degree of vibrancy or boldness of color, indicating that the second set of graphical elements 404 includes newer data.

Figure 5:
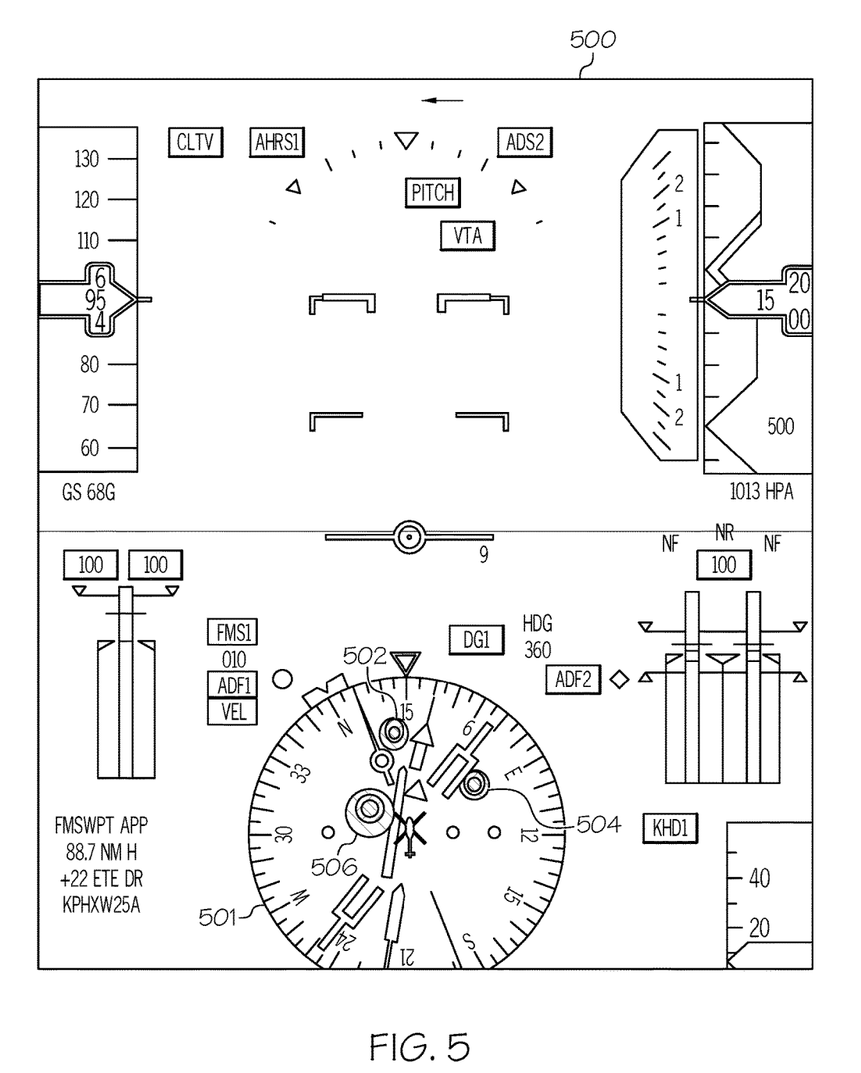
FIG. 5 is a diagram of a third presentation of connected weather data, in accordance with the disclosed embodiments.

FIG. 5 is a diagram of a synthetic vision system (SVS) 500 and a horizontal situation indicator (HSI) 501 display, which present graphical elements representing radar weather data and connected weather data, like that described with regard to FIGS. 3-4. As shown, the first set of graphical elements 502 is displayed using hashed lines, indicating that the first set of graphical elements 502 represent connected weather data obtained from external sources. Additionally, the first set of graphical elements 502 are presented with a high degree of transparency, indicating that the connected weather data is older data that was not obtained recently.

The second set of graphical elements 504 is also displayed using hashed lines, indicating that the second set of graphical elements 504 also represents connected weather data obtained from external sources. The second set of graphical elements 504, in contrast to the first set of graphical elements 502, is presented with a low level of transparency and more boldness in color, indicating that the second set of graphical elements 504 represents newer data than the data represented by the first set of graphical elements 502.

The third set of graphical elements 506 is displayed as a solid entity, indicating that the third set of graphical elements 506 represents radar weather data. The third set of graphical elements 506 is presented with a low level of transparency and more boldness in color (like the second set of graphical elements 504), indicating that the third set of graphical elements 506 represents newer data than the data represented by the first set of graphical elements 502.

Figure 6:
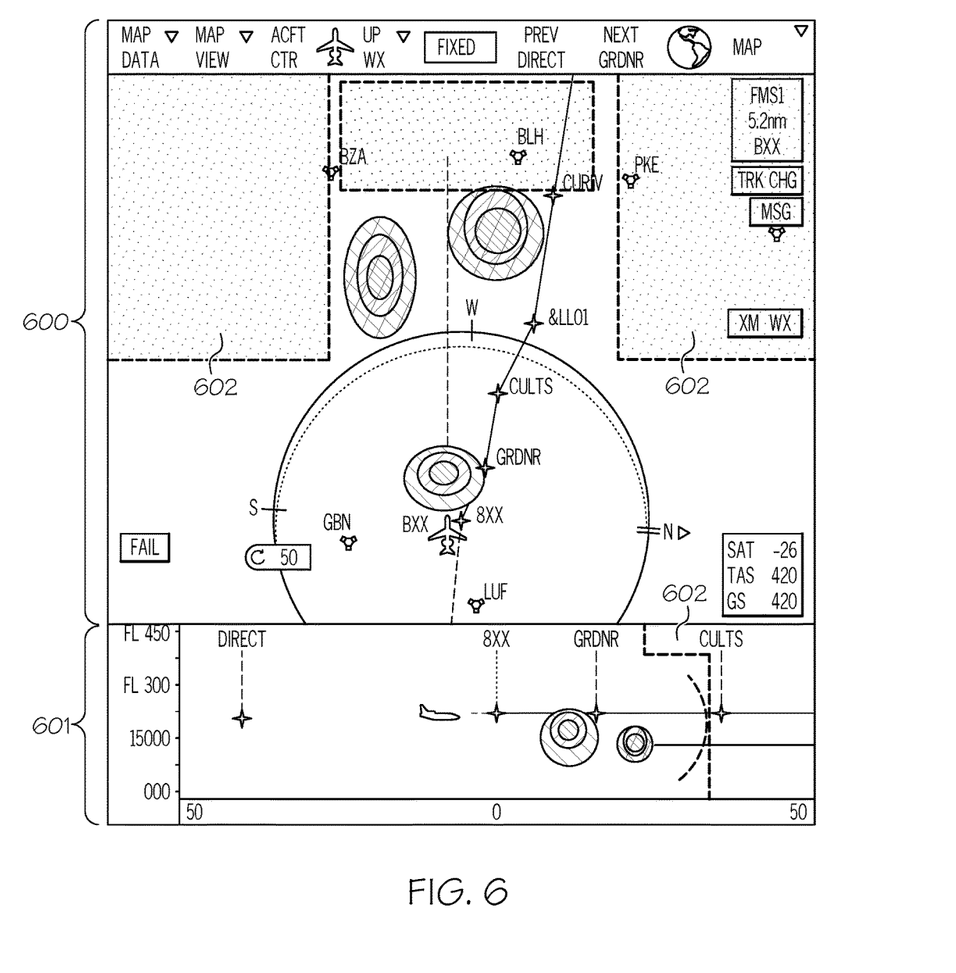
FIG. 6 is a diagram of a fourth presentation of connected weather data, in accordance with the disclosed embodiments.

FIG. 6 is a diagram of a map display 600 and a vertical display 601 of connected weather data and radar weather data, in accordance with the disclosed embodiments. As shown, the map display 600 presents connected weather data (i.e., weather data obtained from external sources) in a format distinct from the onboard radar weather data representation on the cockpit displays (e.g., the map display 600 and the vertical display 601). The onboard weather radar scan is shown in solid patches, whereas the connected weather data is shown using hashed lines.

The embodiment shown is a case in which the connected weather data is not available for certain regions, because no aircraft has traveled through these regions recently. Even if available and requested, the connected weather data may not have been received by onboard avionics. A blank display may mislead a flight crew to believe that such areas are free of weather activity. A dashed border line 602, which may be presented using highlighting, color, or other distinguishing visual characteristics, may be used to indicate that connected weather data is unavailable in regions for which connected weather data has not been received, as shown.

Figure 7:
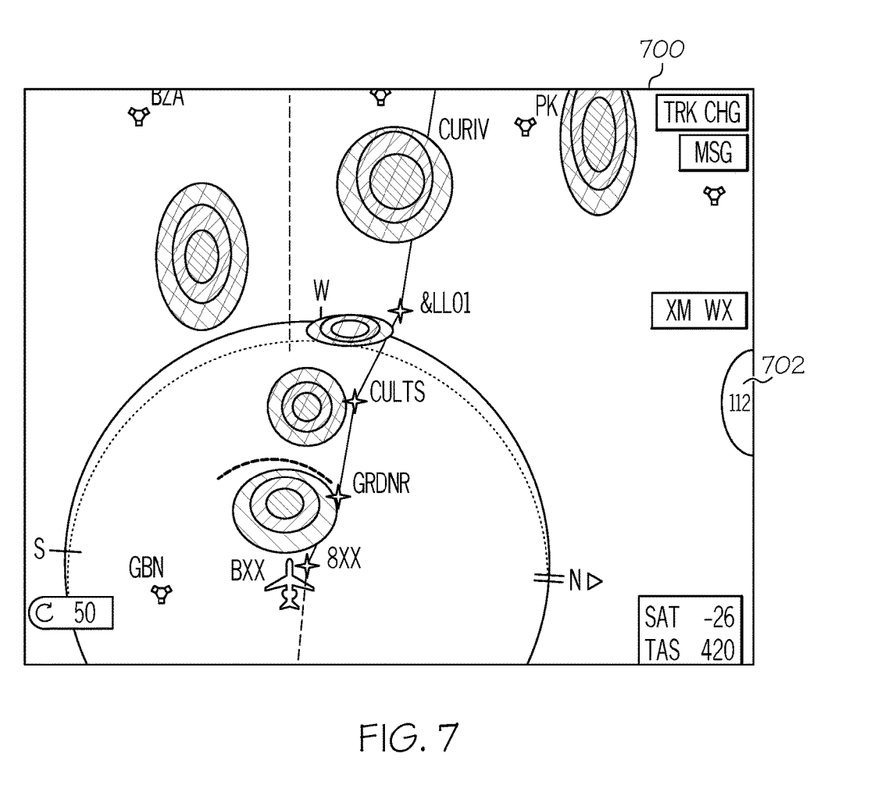
FIG. 7 is a diagram of a fifth presentation of connected weather data, in accordance with the disclosed embodiments.

FIG. 7 is a diagram of a map display 700 of connected weather data and radar weather data, in accordance with the disclosed embodiments. As shown, the map display 700 presents connected weather data (i.e., weather data obtained from external sources) in a format distinct from the onboard radar weather data representation. The onboard weather radar scan is shown in solid patches, whereas the connected weather data is shown using hashed lines.

As shown, off-screen weather is indicated using a first set of graphical elements 702. For example, the first set of graphical elements 702 may include a colored shape at an edge of the map display 700 corresponding to the location of the off-screen weather data. In certain embodiments, the first set of graphical elements 702 may include a text indication of a distance to the weather. In some embodiments, when a flight crew member selects the first set of graphical elements 702 via user interface (e.g., mouse-click or touch-screen selection), the display slews to the weather area in a fashion like the next waypoint function.

Figure 8:
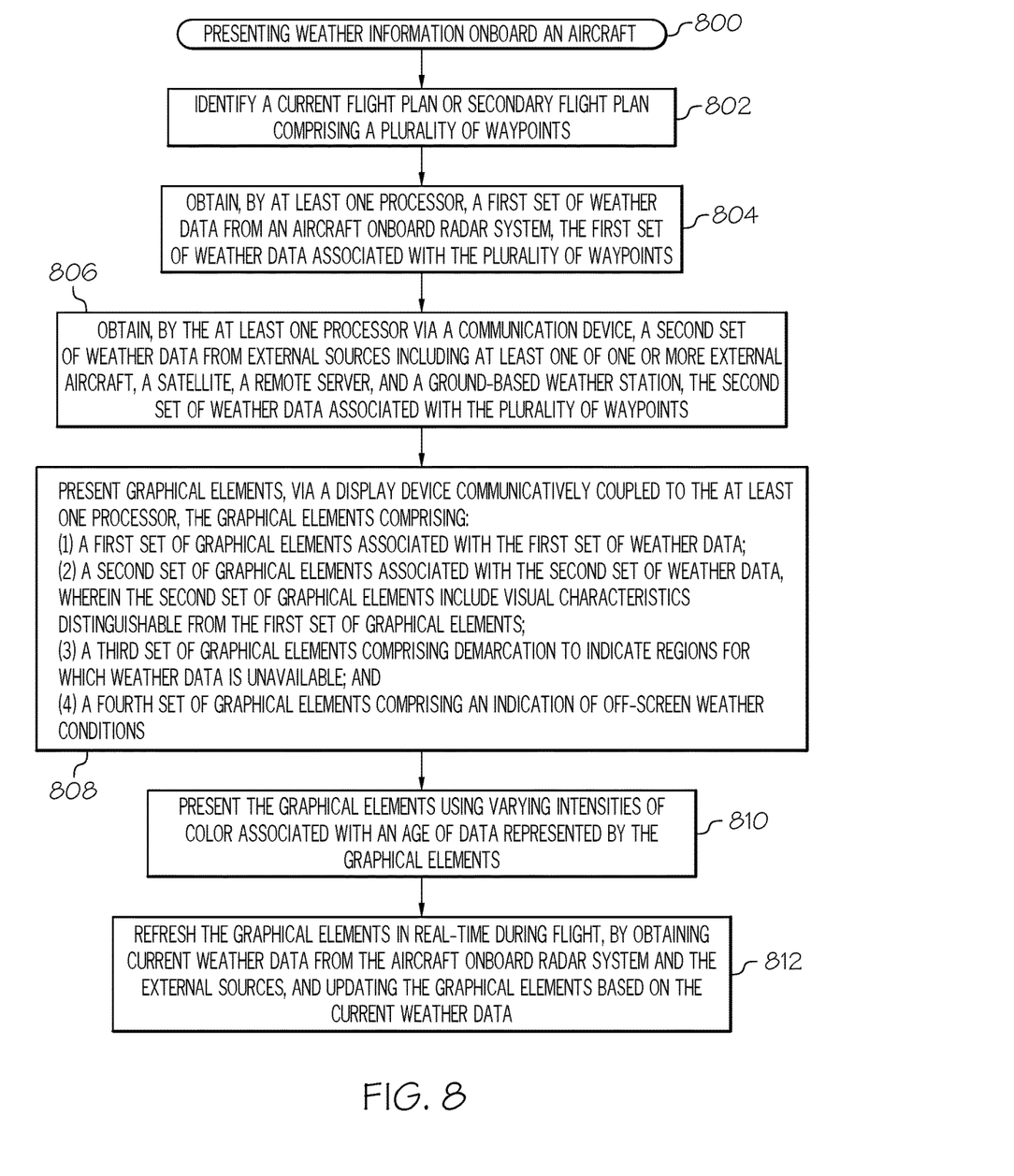
FIG. 8 is a flow chart that illustrates an embodiment of a process for presenting weather information onboard an aircraft.

FIG. 8 is a flow chart that illustrates an embodiment of a process 800 for presenting weather information onboard an aircraft. The various tasks performed in connection with process 800 may be performed by software, hardware, firmware, or any combination thereof. For illustrative purposes, the following description of process 800 may refer to elements mentioned above in connection with FIGS. 1-7. In practice, portions of process 800 may be performed by different elements of the described system. It should be appreciated that process 800 may include any number of additional or alternative tasks, the tasks shown in FIG. 8 need not be performed in the illustrated order, and process 800 may be incorporated into a more comprehensive procedure or process having additional functionality not described in detail herein. Moreover, one or more of the tasks shown in FIG. 8 could be omitted from an embodiment of the process 800 as long as the intended overall functionality remains intact.

In certain embodiments, the process 800 begins by identifying a current flight plan or a secondary flight plan onboard an aircraft, wherein the current flight plan (or secondary flight plan) comprises a plurality of waypoints (step 802). The process 800 generally obtains such flight plan data from a Flight Management System (FMS) or other avionics systems onboard the aircraft. Here, the process 800 determines the applicable geographic area for which connected weather data is applicable. A waypoint is a predetermined geographic position that is defined in terms of latitude and longitude coordinates, and thus the plurality of waypoints includes a plurality of latitude and longitude coordinates defining a geographic area.

The process 800 obtains, by at least one processor, a first set of weather data from an aircraft onboard radar system, the first set of weather data associated with the plurality of waypoints (step 804). In other words, the first set of weather data is associated with the geographic area defined by the flight plan (e.g., the waypoints).

The process 800 also obtains, by the at least one processor via a communication device, a second set of weather data associated with the plurality of waypoints (step 806), wherein the second set of weather data is obtained from external sources including at least one of one or more external aircraft, a satellite, a remote server, and a ground-based weather station. As shown by steps 804 and 806, the process 800 obtains two sets of weather data for the geographic area defined by the waypoints of the flight plan. The first set of weather data includes radar weather data, and the second set of weather data includes information obtained from other external sources. Generally, the aircraft onboard radar system is limited by an operating range of the radar system, but the external sources are not limited by this radar range. The external sources provide weather data directly from other aircraft in the area (e.g., via VHF radio communications, via transponder communications), weather data directly from ground control, and/or weather data that has been obtained and uploaded to a remote server. Thus, the second set of weather data provides additional weather information extending beyond the operating range of the aircraft onboard radar and which therefore may unavailable via the aircraft onboard radar system.

In some embodiments, the first set of weather data and the second set of weather data are obtained by the process 800 in response to a received user request, via a user input device. In other embodiments, however, the first set of weather data and the second set of weather data are obtained by the process 800 according to a timed interval schedule, or when triggered by a particular event to obtain each of the first set of weather data and the second set of weather data. For example, the process 800 may detect a range boundary of the aircraft onboard radar system, and when a new boundary is detected during flight, the process 800 may automatically request an updated second set of weather data, based on the new radar range boundary. As another example, the process 800 may detect a zone of strong weather activity that is masked by a second strong weather system and automatically request weather data for the zone of strong weather activity, based on detecting the zone.

After obtaining the first set of weather data and the second set of weather data (steps 804 and 806), the process 800 presents graphical elements, via a display device communicatively coupled to the at least one processor, wherein the graphical elements comprise: (1) a first set of graphical elements associated with the first set of weather data; (2) a second set of graphical elements associated with the second set of weather data, wherein the second set of graphical elements include visual characteristics distinguishable from the first set of graphical elements; (3) a third set of graphical elements comprising demarcation to indicate regions for which weather data is unavailable; and (4) a fourth set of graphical elements comprising an indication of off-screen weather conditions (step 808). One suitable methodology for presenting the graphical elements is described below with reference to FIG. 9.

The first set of weather data and the second set of weather data are presented by the process 800 using distinguishing visual characteristics such that flight crew members are able to recognize the visual contrast between weather data obtained via radar system and weather data obtained via external sources. The process 800 also presents a barrier or demarcation on the display to indicate regions for which weather data is unavailable. Additionally, due to the size limitations of the display device presenting the graphical elements, the process 800 may not have the capability of showing weather data for the entire flight plan. In this case, when additional weather data has been obtained for geographical areas not shown on the display device, the process 800 presents graphical elements indicating the off-screen weather conditions, such that the flight crew has a more complete set of weather data for the flight plan.

The process 800 also presents the graphical elements using varying intensities of color associated with an age of data represented by the graphical elements (step 810). In some embodiments, graphical elements associated with new or more recent data are shown using bolder colors, brighter colors, and with increased intensity of color, while the graphical elements associated with older data may be shown using an increased level of transparency, translucency, or other types of less-vibrant colors.

During flight and in real-time, the process 800 refreshes the graphical elements by: (1) obtaining current weather data from the aircraft onboard radar system and the external sources, and (2) updating the graphical elements based on the newly-obtained, current weather data (step 812). The process 800 maintains communication connections to the aircraft onboard radar system and to the external sources (e.g., one or more external aircraft, a satellite, a remote server, and a ground-based weather station).

Figure 9:
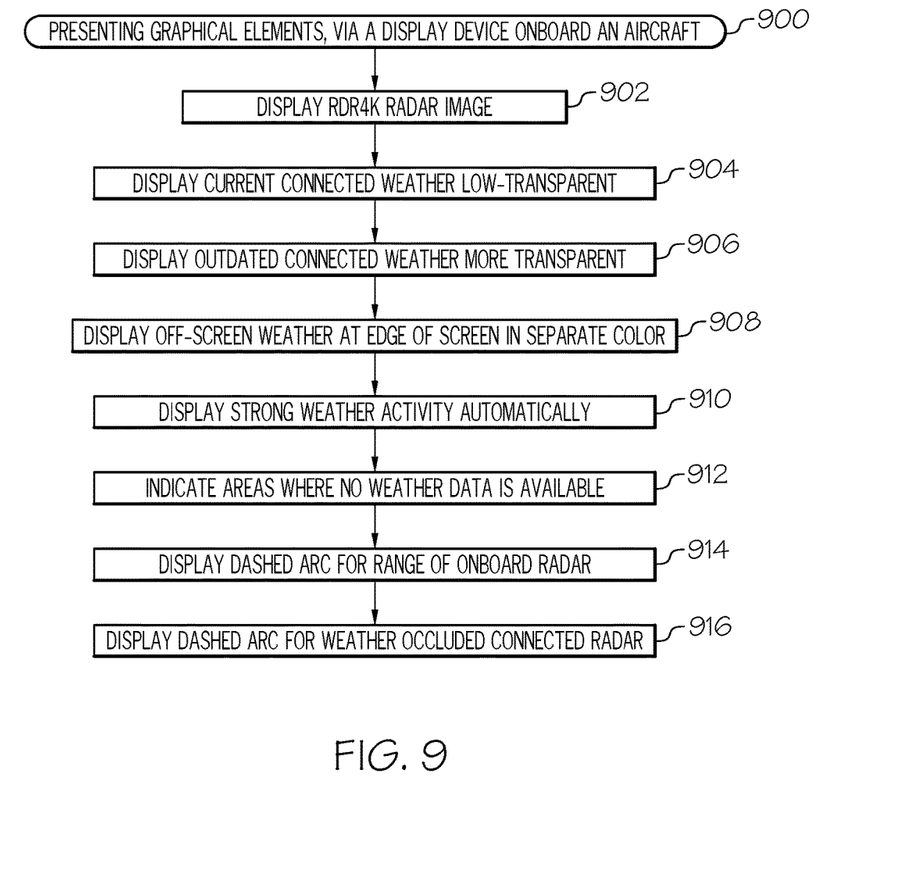
FIG. 9 is a flow chart that illustrates an embodiment of a process for presenting graphical elements, via a display device onboard an aircraft.

FIG. 9 is a flow chart that illustrates an embodiment of a process 900 for presenting graphical elements, via a display device onboard an aircraft. It should be appreciated that the process 900 described in FIG. 9 represents one embodiment of step 808 described above in the discussion of FIG. 8, including additional detail.

The process 900 displays an RDR4K radar image (step 902), graphical elements representative of aircraft onboard radar-obtained weather data. The process 900 displays current connected weather low-transparent (step 904), and the process 900 displays outdated connected weather more transparent (step 906). As described previously, in some embodiments, graphical elements associated with new or more recent data are shown using bolder colors, brighter colors, and with increased intensity of color, while the graphical elements associated with older data may be shown using an increased level of transparency, translucency, or other types of less-vibrant colors.

The process 900 displays off-screen weather at edge of screen in separate color (step 908). Here, the process 900 indicates off-screen weather conditions using one or more graphical elements, which may include a colored shape at an edge of the RDR4K image display, wherein the colored shape corresponds to the location of the off-screen weather data.

The process 900 displays strong weather activity automatically (step 910). Within the presented RDR4K display image, the process 900 indicates areas where no weather data is available (step 912). Regions for which connected weather data and radar weather data is not available, requested, or obtained, are shaded differently such that the flight crew is notified of potential weather data for such regions. The process 900 displays a dashed arc to indicate the range of the onboard radar (step 914), and the process 900 displays a dashed arc for weather occluded onboard radar (step 916), as described previously with regard to FIG. 3.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

The following description refers to elements or nodes or features being "connected" or "coupled" together. As used herein, unless expressly stated otherwise, "coupled" means that one element/node/feature is directly or indirectly joined to (or directly or indirectly communicates with) another element/node/feature, and not necessarily mechanically. Likewise, unless expressly stated otherwise, "connected" means that one element/node/feature is directly joined to (or directly communicates with) another element/node/feature, and not necessarily mechanically. Thus, although the schematic shown in FIG. 2 depicts one exemplary arrangement of elements, additional intervening elements, devices, features, or components may be present in an embodiment of the depicted subject matter.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for presenting weather information onboard an aircraft, the method comprising:
obtaining, by at least one processor, a first set of weather data from an aircraft onboard radar system;
obtaining a current flight plan comprising a set of waypoints, by the at least one processor;
determining a swath extending to sides of the current flight plan defined by the set of waypoints;
based on the current flight plan and the swath, automatically requesting a second set of weather data for areas extending beyond an operating range of the aircraft onboard radar system;
in response to automatically requesting the second set of weather data, obtaining, by the at least one processor via a communication device, the second set of weather data from external sources including at least one of one or more external aircraft, a satellite, a remote server, and a ground-based weather station, wherein the communication device is compatible with a communication protocol for the external sources, and wherein the communication protocol comprises at least one of a datalink communication protocol, a satellite communication protocol, a very high frequency (VHF) radio communication protocol, and a transponder communication protocol;
presenting graphical elements comprising a first set of graphical elements associated with the first set of weather data and a second set of graphical elements associated with the second set of weather data, via a display device communicatively coupled to the at least one processor, wherein the second set of graphical elements include visual characteristics distinguishable from the first set of graphical elements;
detecting a rain attenuation area, by the at least one processor via the aircraft onboard radar system;
in response to detecting the rain attenuation area, automatically requesting a third set of weather data for the rain attenuation area, wherein the third set of weather data is requested from the external sources; and
presenting rain attenuation area graphical elements, via the display device, wherein the rain attenuation graphical elements comprise at least a rain attenuation demarcation indicating weather occluded connected radar, wherein the second set of graphical elements comprise the rain attenuation area graphical elements, and wherein the rain attenuation area graphical elements include visual characteristics distinguishable from the first set of graphical elements.

2. The method of claim 1, further comprising:
determining unavailability of weather data for certain regions of the areas extending beyond the operating range of the aircraft onboard radar system, based on the received second set of weather data lacking the weather data for the certain regions;
identifying the certain regions represented via a map display presented by the display device; and
presenting a third set of graphical elements, via the display device, wherein the third set of graphical elements comprises demarcation to indicate the certain regions for which weather data is unavailable, and wherein the graphical elements comprise the third set of graphical elements.

3. The method of claim 1, further comprising:
presenting a fourth set of graphical elements at an edge of a map display comprising an area, via the display device, wherein the fourth set of graphical elements comprises an indication of off-screen weather conditions located in an off-screen area and a text indication of a distance to the off-screen weather conditions, wherein the first set of weather data and the second set of weather data comprises the off-screen weather conditions, and wherein the graphical elements comprise the fourth set of graphical elements;
receiving a user input selection of the fourth set of graphical elements, via a user interface communicatively coupled to the at least one processor; and
in response to the user input selection, slewing the map display to the off-screen area to present the off-screen weather conditions.

4. The method of claim 1, further comprising:
presenting the graphical elements using varying intensities of color associated with an age of data represented by the graphical elements.

5. The method of claim 1, further comprising:
refreshing the graphical elements, in real-time during flight, by:
obtaining current weather data from the aircraft onboard radar system and the external sources; and updating the graphical elements, based on the current weather data.

6. The method of claim 1, further comprising:
presenting the graphical elements via a vertical situation display (VSD) onboard the aircraft.

7. The method of claim 1, further comprising:
identifying the current flight plan or secondary flight plan comprising the set of waypoints;
obtaining a user request for weather data associated with the set of waypoints, via a user interface communicatively coupled to the at least one processor, and wherein the weather data comprises at least the first set of weather data and the second set of weather data; and
presenting the graphical elements via the display device, in response to the user request.

8. The method of claim 1, further comprising:
identifying a flight profile for the aircraft; and
automatically requesting the second set of weather data for areas beyond a range of the aircraft onboard radar system, based on the flight profile.

9. A system for presenting weather information onboard an aircraft, the system comprising:
a system memory element;
an aircraft onboard radar system, configured to obtain radar weather data for the aircraft;
a communication device, configured to obtain externally sourced weather data from external sources including at least one of one or more external aircraft, a satellite, a remote server, and a ground-based weather station, wherein the communication device is compatible with a communication protocol for the external sources, and wherein the communication protocol comprises at least one of a datalink communication protocol, a satellite communication protocol, a very high frequency (VHF) radio communication protocol, and a transponder communication protocol;
a display device, configured to present weather data onboard the aircraft; and
at least one processor, communicatively coupled to the system memory element, the communication device, and the display device, the at least one processor configured to:
obtain a first set of weather data via the aircraft onboard radar system, wherein the radar weather data comprises the first set of data;
obtain a current flight plan comprising a set of waypoints;
determine a swath extending to sides of the current flight plan defined by the set of waypoints;
based on the current flight plan and the swath, automatically request a second set of weather data for areas extending beyond an operating range of the aircraft onboard radar system;
in response to automatically requesting the second set of weather data, obtain the second set of weather data via the communication device, wherein the externally sourced weather data comprises the second set of data;
present graphical elements via the display device, wherein the graphical elements comprise a first set of graphical elements associated with the first set of weather data and a second set of graphical elements associated with the second set of weather data, wherein the second set of graphical elements include visual characteristics distinguishable from the first set of graphical elements;
detect a rain attenuation area, via the aircraft onboard radar system;
in response to detecting the rain attenuation area, automatically request a third set of weather data for the rain attenuation area, wherein the third set of weather data is requested from the external sources; and
present rain attenuation area graphical elements, via the display device, wherein the rain attenuation graphical elements comprise at least a rain attenuation demarcation indicating weather occluded connected radar, wherein the second set of graphical elements comprise the rain attenuation area graphical elements, and wherein the rain attenuation area graphical elements include visual characteristics distinguishable from the first set of graphical elements.

10. The system of claim 9, wherein the at least one processor is further configured to:
identify regions for which weather data is unavailable, based on the received second set of weather data lacking the weather data for the certain regions; and
present a third set of graphical elements, via a map display presented by the display device, wherein the third set of graphical elements comprises demarcation to indicate the regions for which weather data is unavailable, and wherein the graphical elements comprise the third set of graphical elements.

11. The system of claim 9, wherein the at least one processor is further configured to:
present the first set of graphical elements and the second set of graphical elements via a map display presented by the display device;
identify off-screen weather conditions located in an off-screen area that is off-screen to the map display and a distance to the off-screen weather conditions, the off-screen weather conditions associated with the current flight plan;
present a fourth set of graphical elements at an edge of the map display, via the display device, wherein the fourth set of graphical elements comprises an indication of the off-screen weather conditions located in the off-screen area and a text indication of the distance to the off-screen weather conditions, wherein the first set of weather data and the second set of weather data comprises the off-screen weather conditions, and wherein the graphical elements comprise the fourth set of graphical elements;
receive a user input selection of the fourth set of graphical elements, via a user interface communicatively coupled to the at least one processor; and
in response to the user input selection, slew the map display to the off-screen area to present the off-screen weather conditions.

12. The system of claim 9, wherein the at least one processor is further configured to:
present the graphical elements using varying intensities of color associated with an age of the first set of weather data and the second set of weather data represented by the graphical elements.

13. The system of claim 9, wherein the display device comprises a vertical situation display (VSD) onboard the aircraft; and
wherein the at least one processor is further configured to present the graphical elements via the VSD onboard the aircraft.

14. The system of claim 9, further comprising a user interface communicatively coupled to the at least one processor, wherein the user interface is configured to receive user requests for weather data to be presented via the display device; and  wherein the at least one processor is further configured to:
  identify a current flight plan or secondary flight plan comprising a plurality of waypoints;
  obtain a user request for weather data associated with the plurality of waypoints, via the user interface, and wherein the weather data comprises at least the first set of weather data and the second set of weather data; and
  present the graphical elements via the display device, in response to the user request.

15. The system of claim 9, wherein the display device comprises a near-to-eye (NTE) display onboard the aircraft; and
 wherein the at least one processor is further configured to present the graphical elements via the NTE display onboard the aircraft.

16. The system of claim 9, wherein the display device comprises a head-up display (HUD) onboard the aircraft; and
 wherein the at least one processor is further configured to present the graphical elements via the HUD onboard the aircraft.

17. The system of claim 9, wherein the display device comprises a synthetic vision system (SVS) display onboard the aircraft; and
 wherein the at least one processor is further configured to present the graphical elements via the SVS display onboard the aircraft.

* * * * *